United States Patent Office 3,549,568
Patented Dec. 22, 1970

3,549,568
AQUEOUS STARCH-PIGMENT PAPER COATING COMPOSITIONS CONTAINING POLYACRYLAMIDE-GLYOXAL LATENT INSOLUBILIZER
Anthony Thomas Coscia, South Norwalk, and Daniel Dickerson Ritson, Riverside, Conn., Charles Frazier, Kinnelon, N.J., and Joseph Hansbro Ross, South Bend, Ind., assignors to American Cyanamid Company, Stamford, Conn., a corporation of Maine
No Drawing. Filed May 21, 1968, Ser. No. 730,898
Int. Cl. C08g *37/36*
U.S. Cl. 260—17.3
10 Claims

ABSTRACT OF THE DISCLOSURE

Paper coating compositions are provided containing a pigment, starch as binder for the pigment and a latent water insolubilizing agent for the binder. Exemplary of these compositions is a fluid dispersion of clay in aqueous medium containing starch as pigment binder and from about 5 to 20% based on the weight of the starch of a blend or a reaction product of a water-soluble polyacrylamide with about 0.75 mol of glyoxal per mol of polyacrylamide. These compositions cure at low temperatures and provide coatings which possess high wet-rub resistance.

---

This invention relates to paper coating compositions. More particularly, it relates to coating compositions for paper which possess high latent wet-rub resistance properties, and to paper and other water-laid cellulosic webs coated with these coating compositions in thermo-cured state.

Paper coating compositions are generally a fluid suspension of pigment such as clay or the like, in an aqueous medium which includes an adhesive, such as starch, or the like, which binds the pigment to the paper. The adhesives used are water-soluble or water-dispersible and hence the coatings which result from application of these compositions to paper possess little resistance to water and generally produce coated paper having poor wet-rub resistance. The wet-rub resistance of coated paper is particularly important when, for example, the coated paper is to be exposed to water in an offset printing operation or the like, and up to the present it has proved difficult to insolubilize starch in a speedy and economical fashion, cf. Casey, "Pulp and Paper," 2nd ed., vol. III, pp. 1586–1587.

It is therefore a primary object of this invention to provide new and improved paper coating compositions that produce a coating on paper having good wet-rub resistance and which produce such coatings without introducing new time or temperature demands on the paper-coating operation.

Another object of this invention is to provide novel paper coating compositions containing a pigment, a starch as binder for the pigment, and a latent water insolubilizing agent for the starch binder which converts the starch to a water resistant state when paper coated with the composition is heated briefly under paper-drying conditions.

Still another object of this invention is to provide paper products coated with the coating compositions of this invention.

Additional objects and advantages will be set forth in part in the description which follows and in part will be obvious from the description or may be learned by practice of the invention, the objects and advantages being realized and attained by means of the compositions, products and improvements, particularly pointed out in the appended claims.

To achieve the foregoing objects and in accordance with its purpose, this invention, as embodied and broadly described, provides a paper coating composition comprising a paper-coating pigment, a starch as binder for the pigment, and from about 5% to 20%, by weight of the starch, of a latent insolubilizer for the starch comprising a material selected from the group consisting of water-soluble reaction products of water-soluble predominantly acrylamide polymers with at least 1/5 mol of glyoxal, and mixtures of water-soluble predominantly acrylamide polymers with at least 1/5 mol of glyoxal. The proportion of glyoxal is based upon the number of aldehyde-reactive substituents in the polymer. In the case of polyacrylamide, polymethacrylamide, etc., the basis is the number of acrylamide, methacrylamide, etc., residues present. In the case of modified homopolymers, copolymers and interpolymers, the basis is the number of aldehyde-reactive substituents present, including those of the type

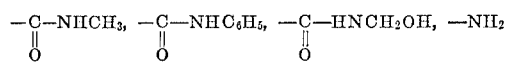

etc.

The paper and paper-like products of the present invention are water-laid cellulosic webs carrying the above-described composition in heat-cured state and are made by coating a cellulosic web with the aforesaid composition and drying the composition and developing the latent insolubilizing properties of the polymer-glyoxal component therein by heating the web for 1 to 3 minutes at 200° F.–300° F.

Glyoxal alone is an insolubilizing agent for starch. We have discovered that polymers of the aforesaid type act as fortifying agents and as extenders for the glyoxal, so as to improve the amount of water resistance imparted by a given quantity of glyoxal.

It is to be understood that both the foregoing general description and the following detailed description are exemplary and explanatory but are not restrictive of the invention.

The compositions of this invention can contain any of the materials which have heretofore been present in paper coating compositions. They may contain suitable pigment material that can be readily dispersed in an aqueous medium to provide a pigment slip for coating paper. Suitable white pigments in common use for paper coating purposes include clay, titanium dioxide, calcium carbonate, and the like. Dyes, perfumes, colored pigments (for example ultramarine blue and carbon black) and bactericides may also be present.

The starch binders present in the compositions of this invention are those which are commonly used for the purpose. They include unmodified starch, oxidized starch, enzyme-converted starches and modified starches containing functional groups such as hydroxyl, carbonyl, amido and amino groups. Converted starches are generally preferred because of their good binding power and lower viscosity. The term "starch," therefore, as used throughout this specification and claims is intended to include any member of the family of starches, or mixtures of two or more starches, which are commonly used as pigment adhesives.

Water-dispersible acrylamide polymers having molecular weights in the range of 1,500 to 120,000 are suitable for preparation of coating compositions of this invention. Optimum molecular weights for the polymers vary within the above range depending on whether the acrylamide polymer is reacted with glyoxal or merely blended with it. Generally, however, lower molecular weight polymers in the above range are preferred, because they are more readily water-dispersible and provide less viscous solutions.

Exemplary of the acrylamide polymers which can be present in the coating compositions of this invention are polyacrylamide, methylolated polycarylamide, polymethacrylamide, and water-soluble acrylamide copolymers prepared by copolymerizing acrylamide (or methacrylamide) with minor amounts of ethyl acrylate, diallyl dimethyl ammonium chloride, N-methylacrylamide, acrylic acid, styrene, butadiene, vinyl acetate, and the like. These polymers are essentially straight chains the linkages whereof are the residues of the aforesaid vinyl monomers.

The polymers are predominantly acrylamide (i.e., they contain at least 50 mol percent of acrylamide residues) as their fortifying action decreases significantly when smaller proportions are present. Preferably, the polymers contain at least 75% of combined acrylamide.

The starch insolubilizing agents of this invention are prepared by either reacting or blending glyoxal with one or more of these acrylamide polymers at a mol ratio of at least ⅕ mol of glyoxal per aldehyde-reactive substituent in the polymer. Higher ratios of glyoxal to polymer have been found to achieve more efficient insolubilization of the starch binder and to afford a less viscous coating composition. It has been found that a mol ratio of glyoxal on the molar basis of about 1:1 represents about the maximum amount of glyoxal that need be used, both because good insolubilization of the pigment binder is achieved below this level and because increasing the amount of glyoxal above this level achieves at most only a slight benefit.

The preferred molar ratio of glyoxal to the aldehyde-reactive substitutes is about ¾:1 as in this range the vinyl polymer provides best fortifying action per unit weight of glyoxal employed.

In accordance with a preferred embodiment of this invention, the starch insolubilizer is prepared by reacting the acrylamide polymer with glyoxal in water at a pH of about 6 to 8. The amide groups of the acrylamide polymers provide the sites to which the glyoxal substituents are attached by the reaction. The reaction is allowed to continue at room or elevated temperature for about half to three-quarters of the time needed to produce gelation. The solution is then stabilized by the addition of acid (such as dilute hydrochloric acid) to a pH to about 3 to 4.

When glyoxal is reacted with the acrylamide polymer to provide a starch insolubilizing agent, the polymer preferably has a comparatively low molecular weight (from about 1,000 to 50,000).

The starch insolubilizing agents of this invention can also be prepared by merely mixing glyoxal with an appropriate acrylamide polymer to provide a blend of the two components. The polymers here employed advantageously have a molecular weight of from about 20,000 to 100,000 or 125,000, and preferably about 60,000, to provide a starch insolubilizer as effective as that prepared by reacting glyoxal with the lower molecular weight acrylamide polymer described above.

In the compositions of the present invention the proportion of binder is based upon the amount of the pigment present. In general, sufficient starch is used to provide firm bonding of the pigment to the paper when the paper is dry. This varies with the precise amount of bonding desired in each instance and with the specific adhesive characteristics of the particular starch used; generally, the amount of starch employed is between 10% and 25% based on the weight of the pigment.

The amount of insolubilizer present is based on the amount of starch present, on the specific insolubilizing capabilities of the polymer present in each instance, and on the ultimate amount of insolubilization desired. As a rule of thumb, it is generally convenient to employ between 5% and 20% of insolubilizer based on the dry weight of the starch.

Suitable amounts of starch and insolubilizer are readily found by trial.

The total solids of the composition in any instance depends upon the method by which the composition is to be applied to the paper, and ranges from 40% to 70% so as to provide a coating of convenient viscosity.

The glyoxal-polymer reaction product or blend is mixed with an aqueous dispersion of the pigment and starch in such proportions that the resulting coating composition contains from about 5% to 20% of the starch insolubilizing agent based on the weight of the starch.

In a preferred embodiment of this invention a paper coating composition is provided that comprises clay, 15% starch based on the weight of the clay, and 10% of a reaction product of glyoxal and polyacrylamide based on the weight of the starch. The reaction product preferably is prepared from 0.75 mol of glyoxal per mol of polyacrylamide.

The compositions of this invention may be coated on paper by any convenient method and the coating is cured by holding the coated paper in a zone having a temperature of about 200° F. to 300° F. The resulting coated paper possesses high wet-rub resistance properties attributable to the coating compositions of this ivention.

To illustrate the invention more specifically, reference is now made to the following specific examples. These examples illustrate the preparation of the paper coating compositions of this invention and the use of these compositions in the preparation of water-resistant coatings on paper.

The wet-rub resistance of the coatings is determined by standard laboratory wet-rub resistance test.

In this test, the composition to be tested is applied to three sheets of standard 50-lb. coating raw stock by means of a 0.005″ Bird applicator. One sheet is then cured for 1 minute in an oven at 220° F., the second for 3 minutes in an oven at 220° F.; and the third for 1 minute in an oven at 300° F. To each sheet is then attached a sheet of black paper.

To determine the wet-rub resistance of the coating, the thumb (in a rubber glove) moistened with water is drawn over the sheet so that any of the coating which is rubbed off by the thumb is transferred to the black paper sheet. The procedure is repeated on two adjacent places of the sheet. The amount of coating transferred to the black paper is then evaluated by visual observation on the scale where 10 designates no removal of coating, 0 designates complete removal of coating, and intermediate numbers designate intermediate amounts removed.

The procedure is repeated with the two remaining sheets and the nine values thus obtained are averaged.

The following examples are illustrative and are not to be construed as limiting the scope and underlying principles of the invention in any way. All parts and percentages referred to herein are by weight unless otherwise indicated.

EXAMPLE 1

To 1 mol of polyacrylamide having a molecular weight of 5,000 to 10,000 prepared by homopolymerization of commercial acrylamide (containing about 5 mol percent of acrylic acid) in aqueous medium is added 0.75 mol of glyoxal as a 40% aqueous solution. The total solids content of the resultant solution is adjusted to 30%. The reaction mixture is then adjusted to a pH of 7.0 with a 50% potassium carbonate solution.

The reaction is permitted to continue for about 5 hours at a temperature of from 25° to 30° C. until a viscosity of K on the Gardner-Holdt scale is achieved. The polymer solution is diluted to a total solids content of 20% and reaction conditions are again continued until a viscosity of Q on the Gardner-Holdt scale is reached. The resulting polymer is composed of vinyl residues of the formulae —CH$_2$—CH(CONH$_2$)— and

—CH$_2$—CH(COOH)— in about 95:5 molar ratio, and so is anionic.

The solution is then diluted to 10% to 15% solids and is stabilized by adjustment to pH 3–5 by addition of dilute hydrochloric acid. It has a solids content of 15.8%.

To a 71% solids clay slip in water is added 15% of oxidized starch based on the weight of the clay.

To aliquots of this suspension are respectively added amounts of the above-described polymer solution to provide the amounts of resin shown in the table below. The solids content of the compositions are then adjusted to 55% to provide a free-flowing coating composition.

Three sheets of paper coating raw stock are coated with each composition using 0.0005" Bird applicator and the coated sheets are cured and the wet-rub resistance of the coatings is determined as described above. Results are as follows:

| Percent polymer based on weight of starch: | Wet-rub resistance value |
|---|---|
| 0 | 0 |
| 5 | 3.5 |
| 10 | 5.4 |
| 20 | 7.0 |

EXAMPLE 2

Polyacrylamide-glyoxal resins are prepared in these examples by the procedure of Example 1 in which the molecular weight of the polyacrylamide is varied from 1,500 to 20,000 and the mol ratio of glyoxal to polymer is varied from 0.5/1 to 1/1.

Starch-clay coating compositions are prepared using 10% of these resins based on the weight of the starch and the compositions are coated on paper sheets. Tests conducted on these sheets ase described above show wet-rub resistance values comparable to those obtained in Example 1, the wet-rub resistnace of the compositions generally increasing as the ratio of resin to starch is increased, but with little significant change in the resistance as the molecular weight of the resin is increased to 20,000.

EXAMPLE 3

Polyacrylamides having molecular weights of from 5,000 to 20,000 are methylolated by reaction with ¼ mol of formaldehyde per mol of acrylamide residue present. The resulting water-soluble polymers are then reacted with 0.75 mol of glyoxal per mol of amide substituents present, in accordance with the procedure of Example 1.

Starch-clay coatings containing 10% of these resins based on the weight of the starch are prepared in accordance with the procedures of Example 1. The wet-rub resistance of these coatings is found to be comparable to that of the coatings prepared in Example 2.

EXAMPLE 4

A copolymer of acrylamide and ethyl acrylate in 80:20 weight ratio is reacted with from 0.5 to 1 mol of glyoxal per mol of acrylamide residue present in accordance with the procedure of Example 1.

Starch-clay coating compositions containing 10% of these resins are found to have effective wet-rub resistance properties though they are somewhat poorer than the wet-rub resistance properties of the coating compositions of Example 1.

EXAMPLE 5

Methacrylamide is reacted with glyoxal at a ratio of 0.75 mol of glyoxal per mol of methacrylamide residues present, in accordance with the procedure of Example 1.

Wet-rub resistance properties of starch-clay coating compositions containing this resin are found to be comparable to those of the compositions of Example 1.

EXAMPLE 6

Various blends of polyacrylamide and glyoxal are prepared at a mol ratio of 0.75 mol of glyoxal per mole of acrylamide residue present in which the molecular weights of the polyacrylamide are varied from 7,000 to 120,000.

Coating compositions containing clay, 15% starch based on the weight of the clay, and various amounts from 5 to 20%, by weight of the starch, of the resin blends are prepared. The compositions are coated on paper and wet-rub resistance tests are conducted on these coated papers in accordance with the procedure described above.

The tests show that the wet-rub resistance values of these blends are comparable to those obtained in Example 1 at the same ratio of resin blend to starch, but at polymer molecular weights around 60,000.

EXAMPLE 7

A coating composition is prepared by adding 15% of starch to a 71% by weight clay slip followed by 10% (based on the weight of the starch) of the water-soluble reaction product of 1 mol of a 95:5 molar ratio acrylamide: diallyl dimethyl ammonium chloride copolymer having a molecular weight of 20,000 (prepared by use of ammonium persulfate as catalyst and isopropanol as chain transfer agent) with ¾ mol of glyoxal per mol of acrylamide residues in the polymer, all as described in Example 1. The polymer is cationic, but flocculation of the clay does not occur.

The composition is applied to paper samples and cured at the temperatures and for the times shown in Example 1. The coatings are tested as described therein. The coatings possess substantially the same wet-rub resistance value as the respective coatings of Example 1.

We claim:

1. In a fluid aqueous paper coating composition comprising a pigment and a starch binder for said pigment: from 5% to 20% (based on the weight of said starch) as latent insolubilizer for said starch of a material selected from the group consisting of (A) water-soluble reaction products of water-soluble predominantly acrylamide polymers with at least ⅓ mol of glyoxal, and (B) mixtures of water-soluble predominantly acrylamide polymers with at least ⅓ mol of glyoxal per aldehyde-reactive substituent in said polymer, said polymer containing at least 50 mol percent of acrylamide residues.

2. A composition according to claim 1, wherein the pigment is clay.

3. A composition according to claim 1, wherein the latent insolubilizer for the starch is a water-soluble reaction product of polyacrylamide with about ¾ mol of glyoxal per acrylamide residue in the polymer.

4. A composition according to claim 1, wherein the latent insolubilizer for the starch is a water-soluble reaction product of a 95:5 to 80:20 molar ratio acrylamide: acrylic acid copolymer with about ½ mol of glyoxal per acrylamide residue in the polymer.

5. A composition according to claim 1, in which the latent insolubilizer for the starch is a water-soluble reaction product of 95:5 to 80:20 copolymer of acrylamide with diallyl dimethyl ammonium chloride with about ¾ mol of glyoxal, per acrylamide residue in the polymer.

6. A composition according to claim 1, wherein the amount of glyoxal is between about ¾ and 1 mol per aldehyde-reactive substituent in said polymer.

7. A composition according to claim 1 in which the acrylamide polymer is a water-soluble reaction product of polymethylolacrylamide with about ¾ mol of glyoxal per amide substituent in said polymethylolacrylamide.

8. A composition according to claim 1, in which the latent insolubilizer is a mixture of an acrylamide polymer and glyoxal.

9. A method of providing a water-laid cellulosic web with a water-resistant pigmented coating, which comprises coating said web with a composition according to claim 1 and heating said web in the range of 200° F.–300° F. for 1 to 3 minutes.

10. A water-laid cellulosic web coated on at least one side with a composition according to claim 1 in dried, heat-cured state.

References Cited

UNITED STATES PATENTS 2,616,818  11/1952  Azorlosa _____ 117—155

WILLIAM SHORT, Primary Examiner

E. WOODBERRY, Assistant Examiner

U.S. Cl. X.R.

117—155, 156; 260—17.4